> United States Patent Office
3,041,138
Patented June 26, 1962

3,041,138
SEPARATION OF NICKEL FROM COBALT-CONTAINING SOLUTIONS
Paul-Emile Corbiau, Antwerp, Belgium, assignor to Société Générale Métallurgique de Hoboken, Hoboken-lez-Anvers, Belgium, a Belgian body corporate
No Drawing. Filed Mar. 7, 1958, Ser. No. 719,759
2 Claims. (Cl. 23—87)

The invention relates to a new process for the removal of nickel from cobalt-containing sulfates or chloride solutions. The invention is more particularly applicable to such solutions, when the ratio Ni/Co is lower than about 50Ni/100Co.

It is known selectively to precipitate nickel from such solutions by the combined action of sulfur in elemental or sulfide form and of a finely divided metal, such as iron or cobalt, or of a cobaltiferous alloy, or of a cobalt compound such as a natural cobalt ore.

When cobalt in metal form is used, the cobalt passes in solution and has to be afterwards reconverted to metal form, at a high cost. If another metal, such as iron or a cobalt alloy, is used, foreign metals, iron more particularly, are introduced into the solution and must afterwards be eliminated if it is desired to obtain a pure cobalt solution to be used for the production of commercial cobalt.

The present invention consists of a process for removing nickel from a cobalt containing sulfate or chloride solution, characterized in that the solution is simultaneously treated with sulfur in elemental and/or sulfide form, in the presence of free alkali, and with $H_2$ under a pressure and at a temperature above normal.

The pressure is advantageously comprised between about 3 and 50 atmospheres, preferably between 3 and 35 atmospheres, and the temperature is advantageously comprised between about 80 and about 115° C.

The present process allows of almost completely eliminating the nickel from cobalt-containing solutions, for instance to a ratio 0.02Ni/100Co, and even below that figure.

The pH should be maintained during the reaction, by addition of an alkali, between the value corresponding to the hydrolysis of Co (about 6.8 measured at the normal temperature and pressure) and a value equal to about 3.

According to a preferential mode of carrying the invention into effect, an amount of a base (NaOH or $NH_3$ or a hydroxide of Co which may contain Ni) is added to a neutral solution of Co and Ni sulfates or chlorides, before or during the application of $H_2$ under pressure, which corresponds to the amount of Ni which it is desired to precipitate, plus an excess corresponding to the amount of cobalt which is unavoidably coprecipitated with nickel and which varies according to the ratio Ni/Co in the solution. The following table may be given by way of example:

| Ratio Ni/Co in the primary solution | Ratio Ni/Co in the solution from which nickel has been removed | Ratio Ni/Co in the precipitate formed |
|---|---|---|
| 50/100 | 10/100 | 20/1 |
| 10/100 | 1/100 | 8/1 |
| 10/100 | 0.3/100 | 3/1 |
| 1/100 | 0.1/100 | 0.65/1 |
| 1/100 | 0.02/100 | 0.30/1 |

The sulfur used as one of the reagents may be in the form of $Na_2S$, or NaHS, or $(NH_4)_2S$, or NiS, or CoS and/or S in elemental form.

The amount of sulfide, for instance a mixed sulfide NiS+CoS which shall be precipitated by means of $Na_2S$ in a first fraction of the primary solution, is advantageously comprised between 5 and 15 moles for 100 moles of cobalt in the solution. Such an amount can be used for a large number of successive operations.

The same remark applies to the use of sulfur which is preferentially added at the commencement of the treatment; the amount of sulfur should be sufficient to precipitate nickel in ten to twenty successive operations, for instance; such a large excess however is indispensable only when nickel should be removed below about 0.5Ni/100Co.

After each operation of nickel precipitation, the precipitate is separated from the cobaltiferous solution, by decantation or filtration, and is re-utilized as a reagent with a new portion of cobaltiferous primary solution to be treated by means of $H_2$ under pressure and with the necessary addition of alkali.

Such re-utilization is repeated until the reagent is saturated with Ni and Co and is replaced by fresh reagent.

The residue is treated for the recovery of the Ni and Co contained therein; that may be done for instance by dissolving it in an acid, or by roasting and leaching it, or by oxidation under pressure, or by substitution of $Cu^{++}$, the residue being utilized in the latter case as a reagent for the elimination of $Cu^{++}$ in solution, whilst obtaining a precipitate of sulfidized Cu.

During the operations for the removal of the nickel, the hydrogen pressure is maintained between about 3 and about 50 atmospheres, according to the equipment available and to the desired speed of nickel removal. The temperature is maintained between about 80° C. and about 115° C.

If the cycle of the nickel removal is carried out under a low pressure, for instance 3 to 7 atmospheres, it may be advantageous to effect the first operation of the cycle at a higher pressure, for instance at 35 atmospheres, in order to "activate" the sulfur-bearing reagent; otherwise the duration required for the first operation may be long (several hours).

The "activation" may also be carried out outside the vessel under pressure, for instance by treating the suspension of sulfur with cobalt in metal form at about 80–95° C. before utilizing it as a reagent for the removal of nickel together with $H_2$ under pressure.

By way of example, the duration of the operation for the removal of nickel from a ratio 1Ni/100Co to a ratio 0.02Ni/100Co, is:

About 3 hours at 90° C. under 7 atmospheres (total pressure).
About 1 hour at 105° C. under 7 atmospheres (total pressure).
About 0.5 hour at 115° C. under 7 atmospheres (total pressure).
Less than 0.5 hour at 105° C. under 35 atmospheres.

*Examples*

(1) 5 grams of NaHS, 2.7 grams of NaOH and 40 grams of sulfur flower are added to one liter of a primary neutral solution of Co and Ni sulfates containing 30 grams Co/liter and 0.3 gram Ni/liter (ratio Ni/Co=1/100).

The mixture is subjected for 30 minutes to a reduction process by means of $H_2$ in an autoclave under a total pressure of 35 atmospheres at 105° C. The supernatant solution freed from nickel is separated by decantation, the ratio Ni/Co in the solution having been lowered to 0.020/100.

One more liter of the primary solution and 1.6 grams of NaOH are now added to the sulfidizing mass remaining in the autoclave and the new mixture is subjected during 45 minutes to a reduction process by means of $H_2$ under pressure at 7 atmospheres and 115° C. The supernatant solution freed from nickel, in which the ratio has been lowered to 0.022Ni/100Co, is separated by decantation.

One more liter of the primary solution and 1.6 grams of NaOH are again added to the sulfidized mass remaining in the autoclave, and the mixture is subjected to the same reduction process as above described, that is, under a pressure of 7 atmospheres and at 115° C.

The operation is repeated another 18 times; at the end of the whole cycle, 20 liters have been obtained of a solution depleted in nickel to a ratio of 0.025Ni/100Co and a residue which after washing and partial drying contains 7.1% Ni, 27.6% Co and 43.5% S.

(2) A primary neutral solution of Co and Ni sulfates containing 29.2 grams Co/liter and 3.1 grams Ni/liter (ratio Ni/Co=10.7/100) is treated by a sulfidizing reagent prepared as follows:

One liter of a neutral Co solution containing about 30 grams Co/liter and 0.3 gram Ni/liter is treated with 5 grams of NaHS and 4 grams of NaOH; after adding 50 grams of sulfur flower, the mixture is subjected to a reduction by means of $H_2$ in an autoclave under a total pressure of 35 atmospheres at 105° C. for one hour; the clear solution is separated by decantation, and the residue is utilized as a reagent for the removal of nickel.

The reagent thus prepared is added to one liter of the primary solution together with 4.7 grams of NaOH and the mixture is treated for about 40 minutes by means of $H_2$ inside an autoclave under a total pressure of 35 atmospheres at 115° C. The supernatant solution, freed from nickel, is separated by decantation, the ratio Ni/Co in this solution having been lowered from 10.7/100 to 0.28/100.

The same treatment is repeated another 9 times, each time on one liter of the primary solution; at the end of the cycle, 10 liters have been in all obtained of a solution having a ratio Ni/Co=0.32/100 and a residue which, after washing and partial drying, contains 24.1% Ni, 19.9% Co and 53.0% S.

I claim:

1. A process for the selective separation of nickel from a solution containing nickel and cobalt and belonging to a class consisting of sulfates and chlorides and containing up to 50 parts of nickel for 100 parts of cobalt, in which a substance selected from the group consisting of sulfur, $Na_2S$, NaHS, $(NH_4)_2S$, NiS and CoS is added to the solution, together with a hydroxide chosen from the class consisting of alkali metal hydroxide, ammonium hydroxide and cobalt hydroxide in an amount sufficient to maintain the pH of said solution at a value between 3 and 6.8, and hydrogen in an amount sufficient to reduce said nickel and cobalt and to maintain the reaction pressure is simultaneously introduced with said substance under a pressure between about 3 atmospheres and about 50 atmospheres, and at a temperature maintained between about 80° C. and about 115° C., said substance being added in an amount to precipitate between 5 and 15 moles of the sulfide of said cobalt and nickel per 100 moles of said cobalt in said solution.

2. A process as claimed in claim 1, in which the hydroxide is admitted progressively during the said precipitation to neutralize progressively the acid formed during said precipitation.

References Cited in the file of this patent
UNITED STATES PATENTS

| | | |
|---|---|---|
| 2,651,562 | De Merre | Sept. 8, 1953 |
| 2,662,009 | Roberts et al. | Dec. 8, 1953 |
| 2,671,712 | De Merre | Mar. 9, 1954 |
| 2,722,480 | Roy | Nov. 1, 1955 |
| 2,778,727 | Schaufelberger | Jan. 22, 1957 |
| 2,778,728 | Roy et al. | Jan. 22, 1957 |
| 2,803,537 | De Merre | Aug. 20, 1957 |